(No Model.)
W. R. DORTON.
ADJUSTABLE SPIRIT LEVEL AND PLUMB DEVICE.
No. 505,445. Patented Sept. 26, 1893.
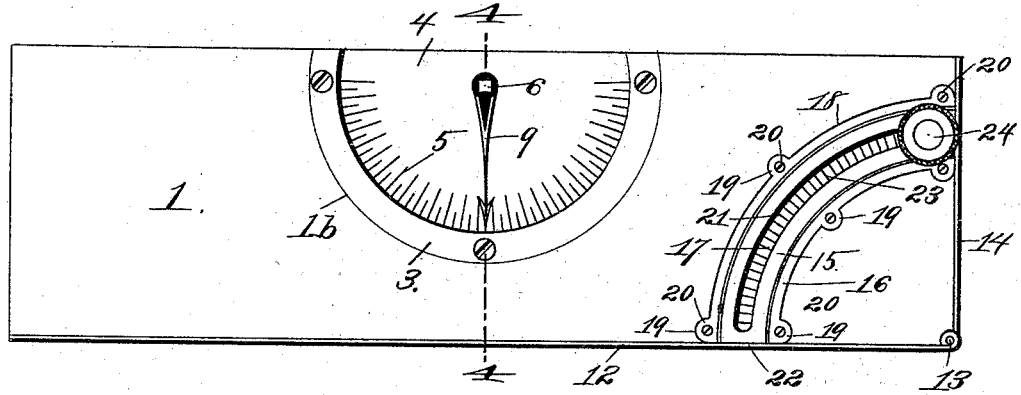
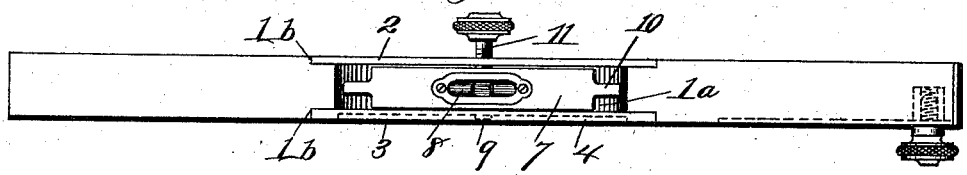
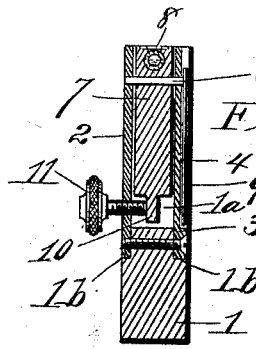
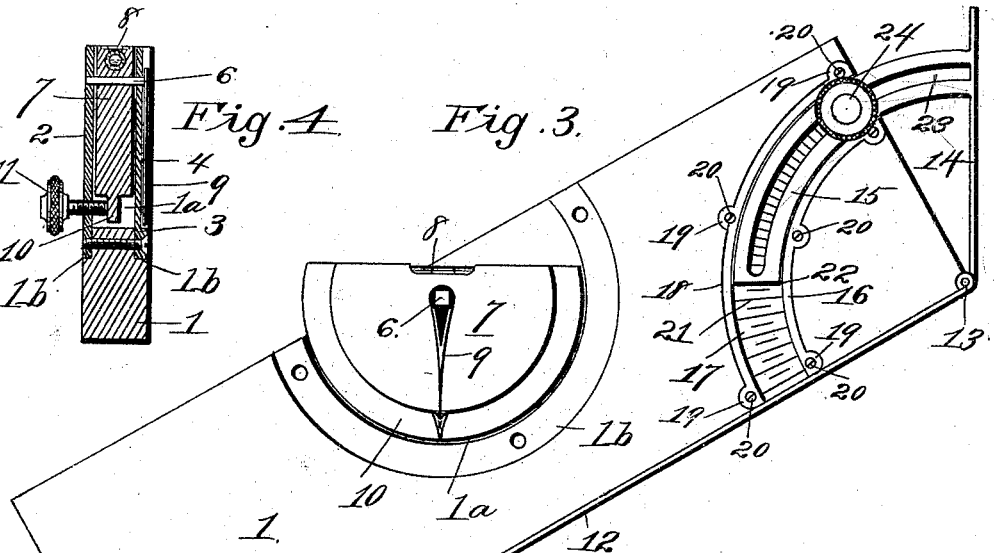
Witnesses:
F. G. Fischer
G. G. Thorpe
Inventor:
Wm. R. Dorton
By Higdon & Higdon
Attys.

UNITED STATES PATENT OFFICE.

WILLIAM R. DORTON, OF ORRICK, MISSOURI.

ADJUSTABLE SPIRIT-LEVEL AND PLUMB DEVICE.

SPECIFICATION forming part of Letters Patent No. 505,445, dated September 26, 1893.

Application filed May 12, 1893. Serial No. 473,935. (No model.)

*To all whom it may concern:*

Be it known that I, WILLIAM R. DORTON, of Orrick, Ray county, Missouri, have invented certain new and useful Improvements in Adjustable Spirit-Levels and Plumbing Devices, of which the following is a full, clear, and exact description, reference being had to the accompanying drawings, forming a part hereof—

My invention relates to improvements in that class of instruments by which a level may be obtained, by which a plumb and inclination may be ascertained or determined and by which also, an object may be set at any inclination desired.

A further object of my invention is to provide an instrument of this character which is simple, strong, durable and inexpensive of construction, and positive, and reliable in operation.

With these objects in view, my invention consists in certain, peculiar and novel features of construction and arrangement of parts, as hereinafter described and claimed.

In order that my invention may be fully understood, I will proceed to describe it with reference to the accompanying drawings, in which—

Figure 1, is a side view of the instrument. Fig. 2, is a top or plan view of the same. Fig. 3, is a view showing the device in position for ascertaining the inclination of an object, or determining the inclination at which an object is to be set. Fig. 4, is a vertical sectional view taken on the line 4—4 of Fig. 1.

In the drawings, 1 designates the stock of the level, which is formed with a semi-circular recess 1ª in one edge, and is also recessed at 1ᵇ, at each side margin of said recess 1ª, in such manner that the semi-circular plates 2 and 3 may be secured thereon so as to lie flush with the level of the stock at each side. The outer face or side of the plate 3 is recessed, so as to form a surface 4 inward of the surface of the stock, and has inscribed thereon a scale 5, to indicate the degrees of inclination of the stock, as hereinafter described. The scale 5 is inscribed radially to the pivot bolt 6, which extends transversely of, and is revolubly mounted in the plates 2 and 3 near their upper edges, and the spirit block 7 is mounted rigidly thereon and arranged so as to swing or operate within the recess of the stock and between the plates 2 and 3; said spirit-block being semi-circular in form, and carrying a spirit vial or tube 8 in its upper horizontal edge. The outer or forward end of the shaft 6 is squared and carries an indicator-finger 9 thereon; said indicator-finger being adapted to register with one of the degrees of the scale 5 as the inclination of the stock is changed. The spirit block 7 is recessed marginally to form the projecting flange 10, and a thumb-screw 11, passing through the rear wall or plate 2 of the stock is adapted to bear upon said flange and hold the spirit block at any desired point.

The construction so far described relates to the leveling device particularly; the graduations of the scale being for the purpose of determining the amount of inclination of any object against which the instrument is placed. When a level is desired, that may be obtained by the use of the spirit-vial or tube 8 in the usual manner, and when a certain inclination is desired, the indicator-finger is registered with the proper degree of the scale 5, and the spirit-block is secured in such position by the thumb-screw 11. This instrument is also provided with an attachment, by which any angle or inclination from a vertical or horizontal plane may be ascertained or laid, and by which any line of inclination may be laid, so that by its use the end of a board may be severed at any angle relative to the side margin thereof. To this end, I secure to the lower longitudinal edge of the stock a plate 12, and pivotally connected at 13 to one end of said plate is a plate 14; said plate being adapted in its horizontal position to lie at right angles from the position of the plate 12, and against the end of the stock. A segmental plate 16 formed with a channel or groove 17 in its face, is secured within the segmental recess 18 in the face of the stock concentric to the pivotal point 13 of the plate 14. This segmental plate 16 is formed with a series of ears 19 through which screws 20 are passed to secure it to the stock. The plate 16 is further formed with a scale 21 arranged radial to the pivotal point 13 of the plate 14, and the segmental arm 15, projecting inwardly from the plate 14 is adapted to engage the groove in the face of said plate 16; the radial edge 22 thereof being adapted to register with the radially arranged scale 21. The segmental arm 15 is also formed with a segmental groove 23, through which a thumb screw 24 is adapted to pass, and into the plate 16, to secure said arm 15 at any desired point. It will thus be seen that I have produced an instrument of the character described, which is simple, strong and inexpensive of construction.

Having thus described my invention, what I claim as new, and desire to secure by Letters Patent, is—

1. A combined spirit-level and plumb, comprising a stock having a marginal recess, plates 2 and 3 secured at opposite sides of said recess, plate 3 being recessed and provided with an inscribed scale, a pivot revolubly journaled in said plates and having an indicator-finger 9, a semi-circular block or pendulum rigidly mounted upon the pivot and located in the recess of the stock, and having a marginal flange 10, and a set-screw passing through one of the plates and engaging said flange, and a spirit-vial 8 carried upon the upper side of the block or pendulum, substantially as set forth.

2. In a combined spirit level and plumb, the combination with a stock, a plate carried by said stock having a scale inscribed thereon, and a block, carrying a spirit-level and an indicator-finger, of a plate pivoted to said stock and having a segmental arm, and a segmental plate secured to said stock and arranged concentric to the pivotal point of the plate having the segmental arm, and having a scale inscribed thereon and adapted to be registered by the radial end of the segmental arm, substantially as set forth.

3. In a combined spirit-level and plumb, the combination with a stock, of a plate secured thereto, and a plate hinged to one end of said plate and having a segmental arm, and a segmental plate secured to the stock having a recess in the face thereof and arranged concentric to the pivotal or hinged point of the plate, and engaged by the segmental arm of the hinged plate, and having a scale inscribed thereon radial to the pivotal point of the hinged plate, and a set screw adapted to clamp the segmental arm at any desired point, substantially as set forth.

4. In a combined spirit-level and plumb, the combination with a stock, of a plate secured thereto and a plate hinged to one end of the first-mentioned plate, and having a slotted segmental arm, and a segmental plate secured to the stock and arranged concentric to the pivotal point of the plate carrying the slotted segmental arm, and having a grooved face engaged by said slotted segmental arm, and a set-screw passing through said slot and into the grooved plate, so that the hinged plate may be held at any angle desired, substantially as set forth.

In testimony whereof I affix my signature in the presence of two witnesses.

WILLIAM R. DORTON.

Witnesses:
J. T. SPENCER,
E. M. MILLER.